March 11, 1969   H. E. RIORDAN   3,431,934
SELF-MODULATING PULSE FLUID SWITCHING VALVE
Filed June 22, 1966   Sheet 1 of 3

INVENTOR.
HUGH E. RIORDAN
BY
Constatine A. Michalos
ATTORNEY

March 11, 1969 H. E. RIORDAN 3,431,934
SELF-MODULATING PULSE FLUID SWITCHING VALVE
Filed June 22, 1966 Sheet 2 of 3

INVENTOR.
HUGH E. RIORDAN
BY
Constantine A. Michalos
ATTORNEY

INVENTOR.
HUGH E. RIORDAN
BY
Constantine A. Michalos
ATTORNEY

United States Patent Office 3,431,934
Patented Mar. 11, 1969

3,431,934
SELF-MODULATING PULSE FLUID
SWITCHING VALVE
Hugh E. Riordan, Wyckoff, N.J., assignor to General Precision Inc., Little Falls, N.J., a corporation of Delaware
Filed June 22, 1966, Ser. No. 559,542
U.S. Cl. 137—119        21 Claims
Int. Cl. G05d 11/00

ABSTRACT OF THE DISCLOSURE

A valve housing is provided including a shuttle member supported therein for reciprocative movement between two extreme limit positions. To effect such movement, an energy source supplies pressurized fluid in alternate succession through a pair of plenum chambers fluidically coupled to the housing at each extreme position. A magnetic coil located in proximity to each extreme position respectively applies predetermined magnetic forces to the shuttle member thereby modifying the fluid forces acting on the latter and controlling the dwell time of the shuttle at each of its limit positions in accordance with the predetermined magnetic forces.

---

This invention relates to electro-fluid-mechanical control elements and more particularly to a bi-stable self-modulating pulse duration modulation fluid switching valve which can be used in a electro-fluid-mechanical control system as a control valve, or in a pneumatic digital computer as a logic element.

The use of pulse duration modulation permits a close approach to the null stability and linearity of a conventional analog servo valve, using only a relatively unrefined, simple and economical on-off type valve. By providing the appropriate means to make the switching valve self oscillate on fluid power, it is possible to reduce the electrical input to an analog low level signal acting on force transducers, such as iron armature solenoids, incorporated in the valve. Thus, the electronics required for the modulation function can be eliminated. That is, in the present invention, because of the low control power needed by the valve, the electronic circuitry required for the modulation and driving function, is completely eliminated.

Heretofore, in pulse duration modulation systems, the generation of the duration modulated signal was performed electrically; the signal was then amplified and applied to the control valve. The associated circuitry was relatively complex and therefore, to some extent, the objectives of low cost and simplicity, which motivate the use of a pulse duration modulation, were defeated.

The present invention relates to a fluid pressure operated valve that can be used in a hot gas flight stabilization system utilizing gas supply pressure as a control source in a fluid operated network signal system such as a system having pressurized gas for the energy supply, to provide controlling signals to a power using device, such as direct reaction jets, a vane motor or an actuating piston within a cylinder to drive the control surfaces of a vessel or vehicle, such as a ship or an aircraft or outer space vehicle. The arrangement of the present invention is of particular advantage in that the valve element is relatively small, compact, and simple. In one embodiment it comprises a cylindrical housing in which there is provided a piston or shuttle having a fit between it and the housing in which it is reciprocatively mounted while fairly close, still with some clearance so that a certain amount of leakage is provided past the shuttle for its operation, as herein more fully described.

An object of the present invention is to provide a self-modulating bi-stable fluid switching valve with a method of controlling the dwell time in each extreme position of its oscillation cycle as a tuned multi-vibrator which is suitable for an open actuation system, such as the type used for a reaction jet or a secondary injection system.

Another object of this invention is to provide a pneumatic computer element applicable for use in a hot gas system requiring high temperature capabilities and having high response, speed, and accuracy requirements.

Another object of this invention is to provide a pneumatic self-modulaing switching valve for use with a compressible fluid suitable for an open actuation system, such a reaction jet or a secondary injection system.

A further object of this invention is to provide a pneumatic computer element capable of performing basic digital functions having self-modulating pulse duration modulation fluid switching.

An additional object of this invention is to provide a simple form of a bi-stable self-modulating switching valve for use with an incompressible fluid, incorporating a method of controlling the dwell time of its two extreme positions of oscillation and having an oscillation cycle of the type of tuned muli-vibrator.

A still further object of this invention is to provide a fluid self-modulating switching valve for use with closed actuation systems such as piston actuators and vane motors.

Further objects and advantages of the present invention will be specifically pointed out or will otherwise become apparent when referring, for a better understanding of the invention, to the following description taken in conjunction with the accompanying drawings, wherein.

Figure 2:
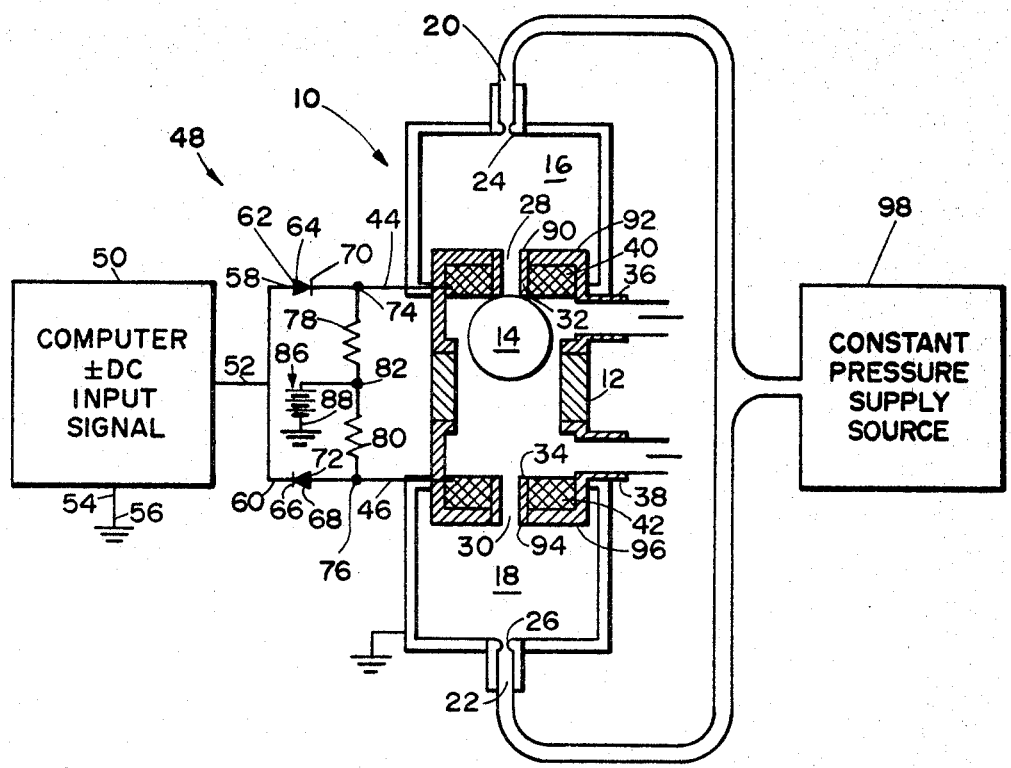
FIGURE 2 is a schematic side sectional view of a self-modulating bi-stable switching valve in accordance with a preferred embodiment of this invention.

Referring to the drawings in detail and particularly to FIGURE 2, the embodiment of this invention primarily provides for a simple form of a self-modulating switching valve 10 for use with a compressible fluid, including an enclosure means, such as a valve cylindrical housing 12 having a shuttle or piston, such as a magnetic ball 14, movable along an axis of the housing 12. In operative relation in the system, the housing 12 supports a pair of plenum chambers 16 and 18 having gas supplying inlets 20 and 22, with timing orifices 24 and 26, respectively.

Interposed between, and pneumatically connecting the plenum chambers 16 and 18 with the cylindrical housing 12 are axially aligned cylinder inlet ports 28 and 30, having ball seats 32 and 34, respectively. In addition, the housing 12 has radial or side connections, such as output ports 36 and 38 for directing pressure signals to secondary injection or reaction jet nozzles (not shown). The shuttle 14 is provided with a sufficiently good fit in the cylinder housing 12 so that a leakage area is provided past the shuttle 14 which is not too large compared with the area of any of the axial ports 28 and 30 and side ports 36 and 38. The shuttle 14 is fitted on the ball seats 32 and 34 upon each extreme position of the oscillation cycle of the shuttle 14, within the cylinder housing 12 to close the inlets 28 and 30, respectively.

Secured circumferentially of the inlets 28 and 30, and coaxially thereto, are a pair of control windings 40 and 42, respectively, having one of their end terminals grounded. The other end terminals 44 and 46 of windings 40 and 42 are connected to an electronic circuitry 48 which receives positive and negative direct current input signals from an electronic computer or other signal source 50 through terminals 52 and 54. Terminal 54 is grounded by line conductor 56 and terminal 52 is connected by line conductors 58 and 60 to an anode 62 of diode 64 and to a cathode 66 of diode 68, respectively. Cathode 70 of diode 64 is connected to line 44 of coil 40 and anode 72 of diode 68 is connected to line 46 of coil 42. Interposed between lines 44 and 46 at junctions 74 and 76 are resistors 78 and 80, respectively. Connected to resistors 78 and 80 at junction 82 is one terminal of a biasing supply 86 the other side of which is grounded by line 88. It should be noted that an appropriate differential current in the magnetic coils 40 and 42 can be produced from the direct current input signal generated by the signal source 50 by means of the circuit 48 shown in FIGURE 2. Further it should be noted that the coils 40 and 42 are provided with magnetic return paths 90 and 92, and 94 and 96, respectively, for the operation of this system as hereinafter more fully described. In addition, it should be noted that if it is not required that the pulse frequency remain constant, then the biasing supply 86 can be omitted, but then the relationship between dwell time and current as hereinafter more fully described, will be a square law, rather than a linear, function.

Figure 12:
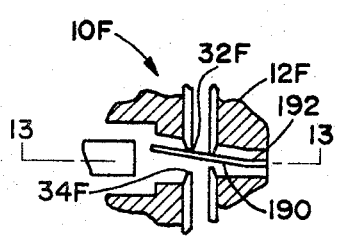
FIGURE 12 is a side sectional view of the element of FIGURE 10 showing a method of securing this element onto the body portion of the valve.

In the operation of the system, shown in FIGURE 2, it should be noted that the principle of a self-modulating valve is based upon the provision of a method of controlling the dwell time of each extreme position of the oscillation cycle of a tuned multi-vibrator of the type described in FIGURE 12 of a U.S. Patent Ser. No. 3,151,623, issued to the present inventor and assigned to the same assignee as the present invention.

The simple form of the self-modulating switching valve for use with a compressible fluid, as shown in FIGURE 2, is suitable for an open actuation system such as for a reaction jet or a secondary injection system or may be used to actuate a power using device such as control surfaces of a vehicle such as a ship or an aircraft or an outer space vehicle.

Referring to FIGURE 2, assuming the piston or magnetic ball 14 is in an upper position within the valve cylinder housing 12 and with no signal applied to the input terminals and therefore with no differential current flowing in the control windings 40 and 42 and with an equal constant pressure applied to the gas supply inlets 20 and 22, the ball would be presumed to be in contact with the ball seat 32. It should be noted generally that the piston or ball 14 will, under zero applied pressure, normally assume a position at one end or the other end of the cylinder 12 due to gravity or external acceleration. If the ball is initially off the seats 32 or 34 upon the application of constant supply pressure from source 98 to the plenum chambers 16 and 18 and thereby to the inlets 28 and 30, the ball 14 will be urged to one end or the other of the cylinder 12 due to normal variations from perfect flow symmetry resulting from fabrication tolerance.

Therefore, with the ball or piston 14 on the seat 32, the ball will be subjected to a downward force, as viewed in FIGURE 2, produced by the action of the upper plenum pressure from the plenum chamber 16, on the ball area enclosed by the upper seat 32. In addition, there would be a downward force produced by the action of the pressure of the upper output port 36 on the annular area of the ball 14 between the outside diameter of the ball 14 and the seat ring 32. In addition, a further upward force, as viewed in FIGURE 2, will be produced by the pressure at the lower end of the cylinder 12 or at the lower output port 38 acting on the total lower surface of the ball 14. At this moment, the pressure at the lower port 38 will urge the ball 14 towards the seat 32. That is, since there is only leakage flow to supply the upper output port 36, the pressure here is very low and the pressure at the upper port 36 may be negligible. Thus when the downward force on the ball 14, which is the product of the upper plenum pressure of chamber 16 and the enclosed area of the upper seat ring exceeds the upward force on the ball 14, which is the product of the lower output port pressure multiplied by the entire cross-sectional area of the ball 14, the ball 14 will be urged in a downward direction. As soon as the ball leaves the seat 32, full plenum pressure from chamber 16 will act on the entire upper ball 14 cross-sectional area rapidly to accelerate the ball 14 downwardly toward the bottom of the cylinder 12 and against the ball seat 34. When the ball 14 reaches the lower seat 34, flow into the lower part of the cylinder 12 ceases and the pressure of the lower output port 38 drops rapidly, so that the ball 14 is held against the lower seat 34 by the pressure acting on the top of the ball 14, just as previously it had been held against the upper seat by the pressure on the underside of the ball.

The control of the motion of the ball 14 from one end to the other end of the cylinder 12 is a function of the time in relation to the pressures in the upper and lower plenum chambers. When the ball 14 is against the upper seat 32, fluid flows into the plenum chamber 16 through the timing orifice 24, causing the pressure to rise as a function of time in accordance with a predictable law which depends on the orifice geometry, the fluid properties, and the volume of the plenum. Eventually, if the ball 14 were to remain seated, the flow through the orifice 24 would cease as the plenum pressure within the chamber 16 reached the supply pressure entering from the gas supply inlet 20. In the meanwhile, the pressure in the lower plenum chamber 18 and within the lower portion of the cylinder 12 reaches an equilibrium value determined by the relative flow resistance of a timing orifice 26 and a cylinder inlet 30 and outlet pasage 38. Since there is exit flow from the plenum, and also a pressure drop through the cylinder inlet 30, the pressure in the lower-half of the cylinder 12 will be substantially less than the pressure which is finally attained in the upper plenum 16. Thus, at a predeterminable time, after the seating of the ball 14, the pressure force on the top of the ball 14 will exceed that on the bottom, and the ball 14 will traverse to the opposite end of the cylinder 12 and the cycle then repeats with the roles of the upper and lower elements of the cylinder assembly reversed.

Figure 1:
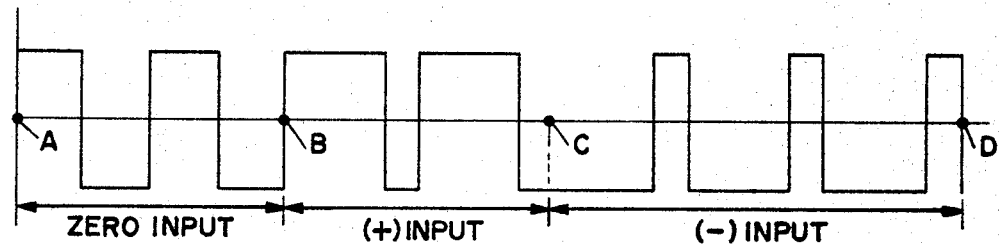
FIGURE 1 is a graph showing the generation of a duration modulated signal, with segments of the graph demonstrating variable dwell time as generated from the operation of the present invention.

The motion of the ball 14 as a function of time will resemble a square wave, as shown from point A to point B in FIGURE 1. The symmetry of the square wave is determined by the end-to-end symmetry of the cylinder output ports 36 and 38, ball seats 32 and 34, plenum chambers 16 and 18, and the timing orifices 24 and 26. The period of the square wave is related to the sum of time constants of the upper and lower orifice-plenum combinations.

Since the dwell time of the ball 14 against one of the seats 32 or 34 is determined by the time required after seating for the net force on the ball to reverse, the dwell time can be modified by adding an additional force on the ball 14. This is done by using the magnetic ball 14 and providing the electromagnetic coils 40 and 42 at each end of the cylinder 12 to alter the force balance on the ball 14 as shown in FIGURE 2. Thus, if a current is directed from the source terminals 52 and 54, and the electromagnets 40 and 42 are of equal power, the dwell time at each end of the cylinder will both be equally increased, and the frequency of the cycling of the ball 14 will be reduced. The configuration of the signal will still resemble the square wave from point A to point B in FIGURE 1.

If the current in the upper coil 40 is now increased, and the current in the lower coil 42 is decreased by an equal amount, the dwell time at the top of the cylinder 12 or the positive position (+) of the ball 14 will be increased and the dwell time at the bottom of the cylinder 12 or the negative position (−) will be decreased while the period remains the same. The configuration of this type of a signal will be recorded as shown between points B and C of FIGURE 1. Similarly, the dwell time can be changed oppositely for opposite changes in the current. That is, the current in the lower coil 42 will be increased, and the current in the upper coil 40 will be decreased by an equal amount. The dwell time at the top of the cylinder 12 or the positive position (+) of the ball 14 will be decreased and the dwell time at the bottom of the cylinder 12 or the negative position (−) will be increased, while the period remains the same to provide a curve as shown in FIGURE 1 from point C to point D. Thus, by this method the ball motion can be pulse duration modulated in accordance with the graph shown in FIGURE 1.

If the flow from the upper output port 36 is arranged to produce a positive reaction force on the vehicle, and that from the lower output port produces a negative force, then the net force on the vehicle will also be pulse duration modulated in the same way as the ball motion, except for a 180 degree phase reversal.

As hereinbefore stated, the appropriate differntial current in the magnetic coils 40 and 42 can be produced from the direct current input signal by means of the circuit 48 shown in FIGURE 2. In addition as mentioned, if it is not required that the pulse frequency remain constant, then the bias circuit can be omitted, but then the relationship between dwell time and signal current will be a square law rather than a nearly linear function.

Figure 3:
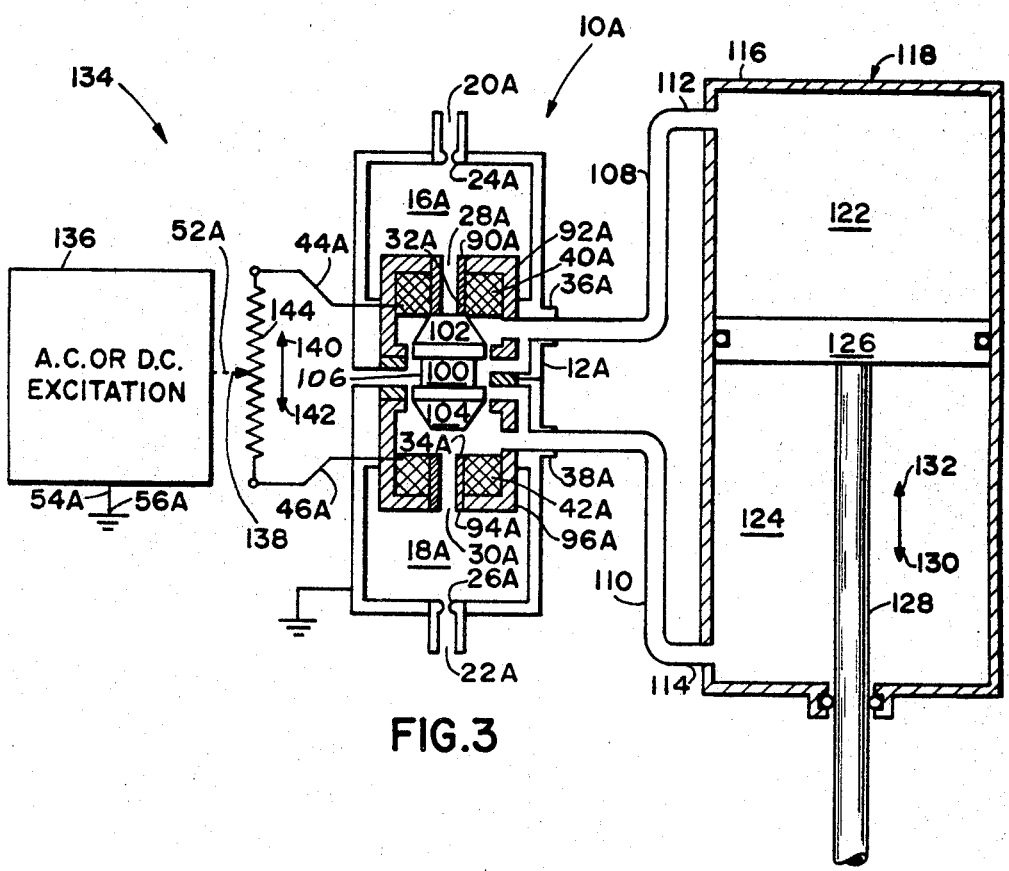
FIGURE 3 is a schematic side sectional view of a bi-stable valve in accordance with a second embodiment of this invention.

Referring to FIGURE 3, the second embodiment of this invention, shows valve 10A having the basic elements of valve 10 of FIGURE 2. Since the elements of valve 10A of FIGURE 3 are substantially the same as those of valve 10 of FIGURE 2, the letter suffix A is added after each number in FIGURE 3 to denote the elements which are the same as those in FIGURE 2.

The primary difference between valve 10A of FIGURE 3 and valve 10 is in that valve 10A uses a spool type piston 100 in place of the ball type piston 14 of valve 10. The spool piston 100 includes opposed conical ends 102 and 104 with a cylindrical groove 106 interposed therebetween. This type of piston 100 is used when the output of the switching valve is to be used to drive a closed load which requires a return flow path. FIGURE 3, therefore, includes necessary return porting such as pressure supply lines or conduits 108 and 110 connecting the output ports 36A and 38A of the valve 10A with inlet ports 112 and 114 of a cylinder 116 incorporated in an actuator 118.

The cylinder 116 also includes two chambers: An upper chamber 122; and a lower chamber 124 separable by a piston 126 as shown in FIGURE 3. The chamber 122 receives pressure from the valve 10A from inlet port 112 and the chamber 124 receives pressure from the valve 10A from inlet port 114.

The piston 126 is connected to a piston rod 128 which is operable for actuating a rudder or a control surface of a vessel or vehicle, such as a ship or an aircraft, or may operate a control mechanism to regulate reaction jet nozzles to direct an outer space vehicle in zero atmospheric pressure. That is, as shown in FIGURE 3, pressure may be directed through inlet port 112 to chamber 122 to drive the piston 126 with the piston rod 128 in a direction shown by arrow 130 or pressure may be directed from the valve 10A through inlet port 114 to chamber 124 to drive the piston 126 with the piston rod 128 in a direction shown by arrow 132 to move the control surface of the vehicles or to actuate the reaction jet nozzles.

Further, as shown in FIGURE 3, there is provided an electric circuit 134 which effects the operation of the valve 10A without separate bias supply. The electrical input to the system is provided by a power supply 136 for directing alternating current or direct current excitation through terminals 52A and 54A. As in the other circuitry, the terminal 54A is grounded through a line conductor 56A, while the terminal 52A is connected to an input mechanical motion wiper 138. The mechanical wiper 138 can be moved in directions shown by arrows 140 and 142 along a resistor 144 to provide a change in the current to coils 40A and 42A through line conductors 44A and 46A, respectively.

The basic operating cycle of FIGURE 3 remains closely similar to that of the ball type unit of FIGURE 2, except that the intrinsic load responsive feedback path is present. It should also be noted, in this respect, that the electrical input means of the electrical circuit 48 of FIGURE 2 and the electrical circuit 134 of FIGURE 3 can be interchangeable.

Generally, it should be noted that a load sensitive feedback is present by virtue of the back pressure produced at the output ports by a load force acting on the actuator piston 126. Thus, for example, with the spool 100 at the top of the cylinder, as shown in FIGURE 3, and an upward force as shown by arrow 132 on the actuator piston 126, the downward force on the spool 100 will be increased over the no-load force by the product of the load-induced back pressure and the annular area at the top of the spool 100. This increase in downward force on the spool 100 reduces the dwell time at this end of the valve 10A thereby producing a resistance to a load force. A corresponding reduction in pressure at the lower end of the cylinder increases the dwell time at that end, producing an additional resistance to the load on the actuator 118. When a load is applied to the actuator 118 in the reverse direction, the feedback reverses to oppose the force.

Figure 4:
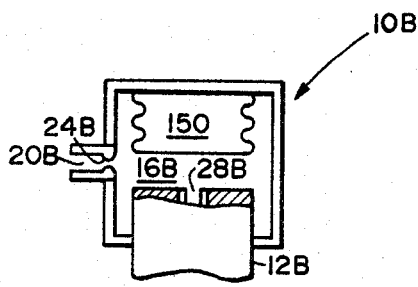
FIGURE 4 is a schematic side sectional view of a fragmentary portion of an element of this invention utilizing a means for permitting volume compliance by the use of bellows, when utilizing an incompressible fluid within the valve.

The operation of the systems shown in FIGURES 2 and 3 presupposes the use of compressible fluid. FIGURE 4 of this invention provides for a switching valve 10B operating with a working fluid which is physically relatively incompressible. To compensate for this incompressible fluid, there is provided in FIGURE 4 a plenum chamber 16B having a gas or spring pressurized bellows 150 utilized as a volume compliance. The remaining parts of the system in FIGURE 4, as liquid supply inlet 20B having timing orifice 24B, may be the same as in FIGURE 2 or 3. Minor variations may be made in the design such as in the inlet 20B of FIGURE 4 being positioned on the side of the plenum chamber 16B rather than on the top as in FIGURES 2 and 3, without substantially affecting the operation.

Figure 5:
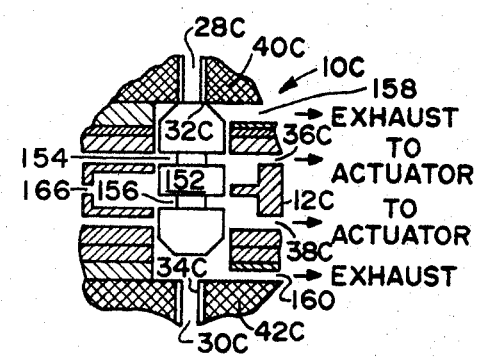
FIGURE 5 is a side sectional view of an element within the valve for separating the actuator flow circuit from the main flow circuit when the load sensitive feedback is not desired.

As brought out before, if the load sensitive feedback is not desired in the spool type drive system shown in FIGURE 3, the feedback flow can be separated from the actuator flow by using a spool 152 of the type shown in FIGURE 5 which includes two cylindrical grooves 154 and 156. In addition, valve 10C of FIGURE 5 may include two exhaust ports 158 and 160. That is, pressure output ports 36C and 38C of FIGURE 5 may be the same as the output ports 36 and 38 of FIGURE 2, and the output ports 36A and 38A of FIGURE 3, except in addition to the porting provided in the valves 10 and 10A of FIGURES 2 and 3, there is provided the exhaust ports 158 and 160 in FIGURE 5.

In the operation of the system shown in FIGURE 5, assuming the piston or spool 152 is in an upper position within valve cylinder housing 12C and with no signals applied to the input terminals of the circuitry shown in either FIGURE 2 or FIGURE 3, depending on the circuitry utilized in this system, and therefore with no current flowing in control windings 40C and 42C, and further with an equal constant pressure applied to the gas supply cylinder inlets 28C and 30C, the spool 152 will be presumed to be in contact with ball seat 32C. Therefore, with the spool 152, on the seat 32C, the spool will be subjected to a downward force, as viewed in FIGURE 5, produced by the action of the upper plenum pressure from the plenum chamber on the area enclosed by the upper seat 32C, and an upward force produced by the pressure at the lower end of the cylinder acting on the total lower surface of the spool 152. At this moment, the pressure at the lower inlet 30C will urge the spool towards the seat 32C. That is, since there is only leakage flow to supply the upper inlet 28C, the pressure here is very low and the force at the exhaust port 158 output may be negligible.

When the downward force on the spool 152 which is the product of the upper plenum pressure multiplied by the enclosed area of the upper seat ring 32C exceeds the upward force on the spool 152, which is a product of the lower inlet 30C pressure multiplied by the entire cross-sectional area of the spool 152, the spool 152 will be urged in a downward direction. As soon as the spool leaves the seat 32C, full plenum pressure from the plenum chamber will act on the entire upper surface of spool 152, rapidly to accelerate the spool 152 downwardly until it reaches the bottom of the cylinder and against the ball seat 34C. When the spool reaches the lower seat 34C flow into the lower part of the cylinder ceases, and the pressure on the lower inlet 30C drops rapidly.

The spool 152 will then be held against the lower seat 34C by the pressure acting on the top of the spool 152 just as previously it had been held against the upper seat 32C by the pressure on the underside of the spool 152. This control motion and the electro-magnetic dwell time forces are exactly the same as for the system shown in FIGURES 2 and 3, except the variation here is that when the flow from the cylinder 116 of the actuator 118, shown in FIGURE 3, is being directed back to the valve 10C, the return flow from the cylinder will be directed through one or the other pressure supply lines 108 or 110 to one or the other actuator ports 36C or 38C to one or the other grooves 154 or 156 and through an exhaust outlet 166. In this respect, the spool drive flow is separated from the actuator flow by using this type of a spool 152 in combination with the porting herein described.

Figure 6:
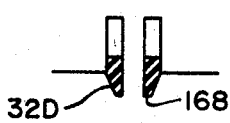
FIGURE 6 is a side sectional view of a variation of an element of this invention.

In some cases, variations in a design of the cylinder inlet seats or valve seats, such as valve seat 32D shown in FIGURE 6 may be desirable to reduce leakage and to provide cushioning of the impact of the ball or spool type piston. By providing protruding seat 32D, shown in FIGURE 6, the oscillating cycle terminates when the piston is seated against an end 168 of the protruding seat 32D. If the seat 32D is made of a resilient material, the system may have an additional advantage in that when the piston is seated on the end 168 of the protruding resilient seat 32D, the leakage between the seat and the piston will be substantially reduced.

Figure 7:
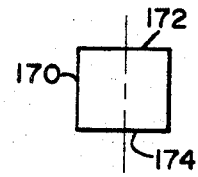
FIGURE 7 is a side sectional view of a variation of another element of this invention.
Figure 8:
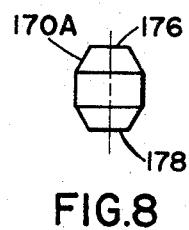
FIGURE 8 is a side view of a further variation of the element shown in FIGURE 7.
Figure 9:
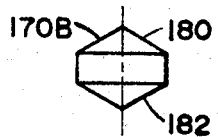
FIGURE 9 is a side view showing another variation of the element of FIGURE 7.

Referring to FIGURES 7, 8, and 9 of the drawings, it can be seen that the ball piston 14 utilized in the valve 10 of FIGURE 2, may take the form of a cylindrical body 170 which may have either flat ends 172 and 174 shown in FIGURE 7, or conical ends 176 and 178 shown in FIGURE 8, or truncated conical ends 180 and 182 shown in FIGURE 9. The remaining valve structure may be substantially as hereinbefore described for FIGURE 2.

Figure 10:
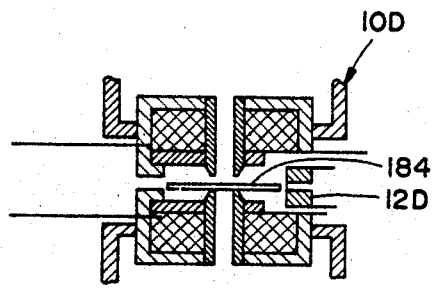
FIGURE 10 is a schematic fragmentary side sectional view showing another variation of the elements of this invention.

Further, as shown in FIGURE 10, a piston in the form of a flat disc 184 may take the place of the ball type piston 14, shown in FIGURE 2 or the spool type pistons 100, shown in FIGURE 3 and 152, shown in FIGURE 5. The other elements of valve 10D of FIGURE 10 may take the form or the elements as hereinbefore described. It should be noted that the cyinder length-to-diameter ratio of FIGURE 10 is different from that of FIGURES 2 and 3 due to the disc shape of the piston 184.

Figure 11:
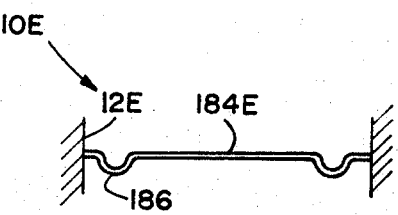
FIGURE 11 is a side view of a further variation of an element of FIGURE 10.

As shown in FIGURE 11, flat disc 184E may have flexible surrounding portion 186. The surrounding portion 186 prevents leakage between the piston disc 184E and the cylinder walls 12E of valve 10E which may be similar to valve 10D of FIGURE 10.

Figure 13:
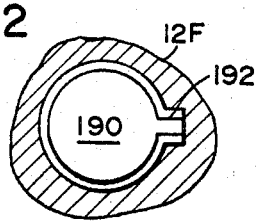
FIGURE 13 is a sectional view of FIGURE 12 taken substantially along line 13—13; and, FIGURE 14 is a circuit diagram for effecting the movement of an element of this invention.

FIGURES 12 and 13 show a disc type piston 190 provided with a hinge tab 192 which is secured to cylinder walls 12F to impart a swinging motion to the disc piston 190 and prevent jamming of the piston 190 in cylinder walls 12F. The valve 10F in this figure is similar to valve 10D of FIGURE 10 except that center piston seats 32F and 34F at the cylinder ends are canted to match the inclination of the disc piston 190 in its extreme positions. With this configuration, a cylinder of rectangular or even other cross-sections can be used.

Figure 14:
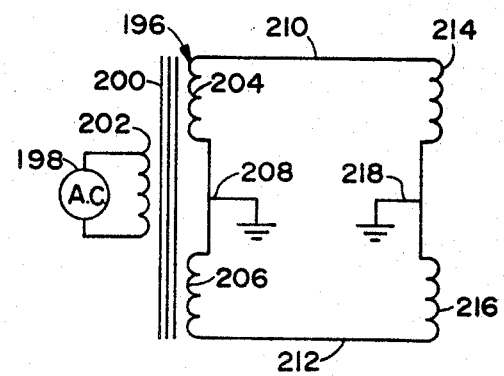

FIGURE 14 shows still another type of electric circuitry 196 utilizing a differential transformer for driving the pistons by coils 40 and 42 as hereinbefore described. Circuitry 196 of FIGURE 14 includes an alternating current supply 198 operable through a movable or oscillating core 200 for providing electromagnetic signals for driving the pistons herein described. The movable core 200 is interposed between a primary coil 202 and two secondary coils 204 and 206. The secondary coils 204 and 206 being connected to ground through a line conductor 208. Connected to the two coils 204 and 206 in parallel by line conductors 210 and 212 are magnetic coils 214 and 216, respectively, which are substantially the same as the magnetic coils 40 and 42 of FIGURE 2 and magnetic coils 40A and 42A of FIGURE 3. The coils 214 and 216 being connected to ground by a line conductor 218. It should be noted that the circuitry of FIGURE 14 and the circuitries of FIGURES 2 and 3 may be interchangeable to produce a different system of operation.

While the present invention has been described in preferred embodiments, it will be obvious to those skilled in the art that various modifications can be made therein within the scope of the invention, and it is intended that the appended claims cover all such modifications.

What is claimed is:

1. In a bi-stable modulation fluid switching valve having pressurized fluid for energy supply comprising, a valve housing receiving the pressurized fluid in alternate succession at two extreme positions, a shuttle reciprocatively movable within said housing by the alternating fluid pressure for affecting oscillating movement of said shuttle from one to the other of the extreme positions, a control means operable for directing a predetermined force to said shuttle at the extreme positions for producing a controlled dwell time on said shuttle at each of the extreme positions dependent upon the predetermined force, and a plenum chamber fluidically interposed between the pressurized fluid energy supply and said housing at each of the extreme positions producing thereby pressure control for affecting the movement of said shuttle, said plenum chamber including a timing orifice operably receiving the pressurized fluid for producing time control conditions dependent on the configurations of said orifice and dependent on the pressure supplied through said orifice to said plenum chamber and wherein said controlled pressure from said plenum chamber is directed through said housing at each of the extreme positions through axially aligned inlets, and wherein said shuttle is a magnetic piston and said control means includes an electric circuit for providing alternating positive and negative direct current input signals, and a magnetic coil located at each of the extreme positions for receiving said current and thereby producing a predetermined magnetic force upon said magnetic piston at each of the extreme positions.

2. In a bi-stable modulation fluid switching valve having pressurized fluid for energy supply comprising, a valve housing receiving the pressurized fluid in alternate succession at two extreme positions, a shuttle reciprocatively movable within said housing by the alternating fluid pressure for affecting oscillating movement of said shuttle from one to the other of the extreme positions, a control means operable for directing a predetermined force to said shuttle at the extreme positions for producing a controlled dwell time on said shuttle at each of the extreme positions dependent upon the predetermined force, and a pair of plenum chambers, each chamber having a timing orifice fluidically connecting the pressurized fluid energy supply, and said valve housing having axially aligned inlet ports at each of the extreme positions and radially extending output ports adjacent to each of the extreme positions producing thereby a time controlled pressure for affecting the movement of said shuttle dependent on the configuration of said timing orifice and dependent on the pressure supplied through said orifice to said plenum chamber, and wherein said control means includes an electric circuit for providing periodic transmitting signals and receiving means located at each of the extreme positions sensitive to the output of said transmitting signals for producing a periodic time regulated predetermined force upon said shuttle at each of the extreme positions and thereby controlling the dwell time at each extreme position of the oscillation cycle of said shuttle, whereby the time controlled pressure from said plenum chamber and the periodic time regulated predeterminated force from said control means attribute to a signal sensitive time controlled reciprocating pressure at said output ports.

3. The structure of claim 2, further comprising spring pressurized bellows within each of said plenum chambers, permitting compressibility of said bellows upon said system utilizing an incompressible fluid and thereby allowing the switching frequency of said shuttle to be made as low as desired while retaining substantially small plenum chambers.

4. The structure of claim 2, further comprising protruding valve seats at the inlet of said valve housing for reducing the housing length-to-diameter ratio thereby permitting the closing of said inlets by said shuttle in advance of the extreme positions of said housing dependent on the amount of protrusion of said valve seats into said housing, whereby the switching frequency of said valve control pressure at the output ports is increased.

5. The structure of claim 3, wherein said protruding valve seats are of resilient material for impeding any leakage between said plenum chamber and said valve housing when said shuttle contacts said valve seats at the extremes of the oscillating cycle.

6. The structure of claim 2, wherein said electric circuitry includes a pair of magnetic coils one at each of the extreme positions circumferentially of and coaxially to said housing inlets, a first diode having a cathode connecting one magnetic coil at one extreme position, a second diode having an anode connecting the other magnetic coil at the other extreme position, and a pulsating direct current connecting the anode of said first diode and the cathode of said second diode and alternatively directing positive going signals and negative going signals to both of said diodes, said diodes alternately directing current to one or the other of said coils thereby producing alternating predetermined magnetic forces on said shuttle by said coils at one or the other of the extreme positions to change the dwell time of said shuttle at said extreme positions dependent on the resultant of the time control pressures from said plenum chambers and the predetermined magnetic forces.

7. The structure of claim 6, wherein said electric circuitry further comprises an electric biasing supply interposed between the cathode of said first diode and the anode of said second diode thereby producing constant pulse frequency.

8. The structure of claim 2, wherein said shuttle is of a magnetic attracting material and said electric circuitry includes a pair of magnetic coils, one coil at each inlet, a resistor having two ends each end connecting one of said coils, current excitation means operably directing pulsating direct current to said resistor and an input mechanical motion wiper contiguously interposed between said current excitation means and said resistor, and operably movable from one end to the other along said resistor, thereby increasing the magnetic force of one coil while decreasing the magnetic force on the other coil for directing an increased force to said shuttle at one of its extreme positions of its oscillating cycle and thereby to increase the dwell time of said shuttle at said position, and for directing a decreased force to said shuttle at the other of its extreme positions of its oscillating cycle and thereby to decrease the dwell time of said shuttle at said other position, whereby a change in the pressure is alternately directed to one output port relative to the other output port.

9. The structure of claim 2 wherein said shuttle is of a magnetic attracting material and said electric circuitry includes a pair of magnetic coils, one coil at each inlet, an alternating current supply and a transformer having a primary coil receiving the alternating current from said supply, a pair of secondary coils, one secondary coil connected to one magnetic coil and the other secondary coil connected to the other magnetic coil, and an oscillating core interposed between said primary coil and said secondary coils, thereby increasing the magnetic force of one magnetic coil while decreasing the magnetic force of the other magnetic coil for directing an increased force to said shuttle at one of its extreme positions of its oscillating cycle and thereby to increase the dwell time of said shuttle at said position, and for directing a decreased force to said shuttle at the other of its extreme positions of its oscillating cycle and thereby to decrease the dwell time of said shuttle at said other position, whereby a change in the pressure is alternately directed to one output port relative to the other output port.

10. The structure of claim 2, wherein the internal space of said valve housing is of a cylindrical configuration and said shuttle is of a magnetic attracting material and of a spherical configuration operable within said cylindrical housing from one extreme position to the other energized by the alternating pressurized fluid from said plenum chambers, and said electrical circuitry including a pair of magnetic coils, one coil located at each extreme position of said housing, and the periodic transmitting signals of said electric circuitry being of a magnetic inducing force for producing the predetermined force upon said magnetic sphere for causing a dwell time of said sphere at each of said extreme positions dependent on the magnetic force and the pressurized fluid acting upon said sphere from said plenum chambers.

11. The structure of claim 2, wherein the internal space of said valve housing is of a cylindrical configuration and said shuttle is of a magnetic attracting material and of a cylindrical form having flat ends for contacting the axially inlet parts in its oscillation between the two extreme positions within the cylindrical valve housing energized by the pressurized fluid from said plenum chambers, and said electrical circuitry including a pair of magnetic coils located within said cylindrical housing, one at each extreme position, and the periodic transmitting signals of said electric circuitry being of a magnetic inducing force for producing the predetermined force upon said magnetic cylindrical shuttle for causing a dwell time of said shuttle at each of said extreme positions dependent on the magnetic force and the pressurized fluid from said plenum chambers.

12. The structure of claim 2, wherein the internal space of said valve housing of a cylindrical configuration and said shuttle is of a magnetic attracting material and of a cylindrical form having conical ends for contacting the axially alined inlets in its oscillation cycle between the two extreme positions within the valve housing energized by the alternating pressurized fluid from said plenum chambers, and said electrical circuitry including a pair of magnetic coils located within said cylindrical housing, one at each extreme position, and the periodic transmitting signals of said electric circuitry being of a magnetic inducing force for producing the predetermined force upon said magnetic cylindrical shuttle for causing a dwell time of said shuttle at each of said extreme positions dependent on the magnetic force and the pressurized fluid from said plenum chambers.

13. The structure of claim 2, wherein said shuttle is of a magnetic material and of a cylindrical configuration having truncated conical ends for contacting the axially aligned inlets of said valve housing in its oscillation between the two extreme positions within the valve housing, and said electrical circuitry including a pair of magnetic coils located within said housing at each extreme position, and the periodic transmitting signals of said electric circuitry being of a magnetic inducing force for producing the predetermined force upon said shuttle for causing a dwell time of said shuttle at each of said extreme positions dependent on the magnetic force and the pressurized fluid from said plenum chambers.

14. The structure of claim 2, wherein said shuttle is of a magnetic material and is in a form of a flat disc thereby providing a substantial reduction of the housing length-to-diameter ratio for short oscillating travel of the piston between the two extreme positions within the valve housing, and said electrical circuitry including a pair of magnetic coils located within said housing at each extreme position, and the periodic transmitting signals of said electric circuitry being of a magnetic inducing force for producing the predetermined force upon said shuttle for causing a dwell time of said shuttle at each of said extreme positions dependent on the magnetic force and the pressurized fluid from said plenum chambers.

15. The structure of claim 14, wherein said flat disc includes a hinge tab secured to said housing to impart a restraint swinging motion to said disc and thereby prevent jamming of said disc within the housing in its oscillation between the two extreme positions.

16. The structure of claim 14, wherein said flat disc includes a flexible surround connecting said valve housing thereby preventing leakage between said disc and said housing.

17. The structure of claim 2, wherein said shuttle is a spool form having a groove centrally thereof and said valve housing having a central port, pressure using means operably receiving the pressure from the one output port of said valve housing and for directing pressure to the other port of said housing for exhausting said return pressure through the centrally located groove or said spool and out of the central port of said housing.

18. The structure of claim 2, wherein said shuttle is of a spool type configuration having a groove circumferentially centrally thereof and said valve housing having a centrally located exhaust port and said valve further comprising, an actuator having a cylinder fluidically connecting each of the output ports of said valve housing at each end of said cylinder, and a piston movable within said cylinder between the ends of said cylinder, whereby when a pressure pulse is generated at one of said output ports to said cylinder it will drive said piston in one direction and fluid will be driven by said piston through the other of said output ports, thereby providing for a load responsive feedback flow within the basic operating cycle of said valve.

19. The structure of claim 18, wherein said spool type shuttle includes a second circumferentially inscribed groove, whereby when the fluid flow is returned to the other of the output ports from the cylinder of said actuator it is exhausted through the second groove of said spool and out through the centrally located exhaust port of said housing thereby separating the actuator load sensitive feedback flow from the spool drive fluid pressure flow.

20. The structure of claim 2, wherein said valve housing is of a cylindrical configuration and said shuttle is a magnetic ball, and the fluid supplied to the plenum chambers is directed to said magnetic ball through each axially aligned inlet at each end of said cylindrical housing for oscillating said shuttle between the two extreme positions and thereby alternately sealing off the axially aligned inlet ports and the radially extending output ports at said two extreme positions, and for controlling the motion of said ball between the two extreme positions as a function of time in relation to the pressures of the two plenum chambers, and wherein said control means is an electronic circuitry including a pair of magnetic control windings, each winding circumferentially and coaxially secured to each axially aligned inlets at each of the extreme positions of said valve housing, an electronic means operably directing positive going and negative going electronic signals, a first diode having a cathode connecting one magnetic coil at one extreme position and an anode connecting said electronic means for receiving the positive going signals and thereby energizing said one winding at the other extreme position and a cathode connecting said electronic means for receiving the negative going signals and thereby energizing said other winding, whereby alternating magnetic forces are produced on said magnetic ball by said windings for oscillating said ball to one or the other of the extreme positions and to change the dwell time of said ball at said extreme positions dependent on the resultant of the time controlled pressure from said plenum chambers and the predetermined magnetic force from said windings, and a biasing supply interposed between the cathode of said first diode and the anode of said second diode for producing constant pulse frequency, whereby a pulsating time controlled differential pressure will be produced at the output ports.

21. The structure of claim 2, wherein said valve housing is of a cylindrical configuration and said shuttle is a magnetic spool operably movable along a longitudinal axis of said housing, and the fluid supplied to the plenum chambers is directed to said spool through said axially aligned inlets at each end of said cylindrical housing for oscillating said shuttle between the two extreme positions and thereby alternately sealing off the axially aligned inlet ports and the radially extending output ports at said two extreme positions and for controlling the motion of said spool between the two extreme positions as a function of time in relation to the pressures of the two plenum chambers, wherein said control means is an electric circuitry including a pair of magnetic control windings, each winding secured circumferentially on the axial inlets and coaxially thereto at each of the extreme positions of said valve housing, a resistor having two ends, each end connecting one of said magnetic windings, and an input mechanical motion wiper operably interconnecting said supply of current and said resistor and movable along said resistor for interchangeably supplying increasing current to one winding while supplying decreasing current to the other winding, and thereby increasing the magnetic force of one winding while decreasing the magnetic force of the other winding, for directing predetermined forces to said spool at each of said extreme positions and thereby increase or decrease the dwell time of said spool at said extreme positions to result in periodic time regulated pressure supply to one output port relative to the other, and an actuator having a cylinder with inlet ports at each end position, each inlet connecting one valve housing outlet port, a piston interposed between said inlets and operably movable in said cylinder by pressure received through said inlets from the output ports of said valve housing effecting movement of said piston dependent on the sum of the magnetic force from said control means and the time regulated pressurized fluid from said plenum chambers.

References Cited

UNITED STATES PATENTS

| | | | |
|---|---|---|---|
| 3,151,623 | 10/1964 | Riordan | 137—624.14 X |
| 3,246,662 | 4/1966 | Shebanow. | |
| 3,326,236 | 6/1967 | Beckett | 137—624.14 |

ALAN COHAN, *Primary Examiner*.

U.S. Cl. X.R.

137—624.14; 235—201